US009889639B2

(12) United States Patent
Nielsen et al.

(10) Patent No.: US 9,889,639 B2
(45) Date of Patent: Feb. 13, 2018

(54) METHOD OF FORMING A CURED MINERAL FIBRE PRODUCT

(71) Applicant: Rockwool International A/S, Hedehusene (DK)

(72) Inventors: Dag Nielsen, Roskilde (DK); Gorm Rosenberg, Gadstrup (DK)

(73) Assignee: Rockwool International A/S, Hedehusene (DK)

( * ) Notice: Subject to any disclaimer, the term of this patent is extended or adjusted under 35 U.S.C. 154(b) by 192 days.

(21) Appl. No.: 14/648,774

(22) PCT Filed: Dec. 5, 2013

(86) PCT No.: PCT/EP2013/075607
§ 371 (c)(1),
(2) Date: Jun. 1, 2015

(87) PCT Pub. No.: WO2014/090670
PCT Pub. Date: Jun. 19, 2014

(65) Prior Publication Data
US 2015/0298449 A1 Oct. 22, 2015

(30) Foreign Application Priority Data

Dec. 11, 2012 (EP) .................................... 12196426

(51) Int. Cl.
*B32B 38/00* (2006.01)
*D04H 1/4209* (2012.01)
(Continued)

(52) U.S. Cl.
CPC ....... *B32B 38/0012* (2013.01); *D04H 1/4209* (2013.01); *D04H 1/4218* (2013.01); *D04H 1/4226* (2013.01)

(58) Field of Classification Search
CPC .................................. B32B 5/12; B32B 38/12
(Continued)

(56) References Cited

U.S. PATENT DOCUMENTS 4,917,750 A * 4/1990 Klose ..................... D04H 1/00
156/254
4,950,355 A 8/1990 Klose
(Continued)

FOREIGN PATENT DOCUMENTS

| WO | 199416164 A1 | 7/1994 |
| WO | 199736035 A1 | 10/1997 |
| WO | 2008155401 A1 | 12/2008 |

OTHER PUBLICATIONS

International Search Report and Written Opinion for PCT/EP2013/075607, dated Jan. 20, 2014.

*Primary Examiner* — Scott W Dodds
(74) *Attorney, Agent, or Firm* — Dinsmore & Shohl LLP

(57) ABSTRACT

A method of forming a cured mineral fiber product which includes at least a top layer having mineral fibers and a base layer having mineral fibers. The method includes the steps of providing the top layer web including uncured mineral wool, providing the base layer web including cured mineral wool, joining the uncured top layer web and the cured base layer web to form an assembled laminate, and curing the top layer web in a curing oven by transporting the assembled laminate into a curing oven having an upper conveyor and a lower conveyor for curing the assembled laminate, the assembled laminate being positioned between the upper and lower conveyors. The uncured top layer web is compressed by at least 50% as it enters into the curing oven.

7 Claims, 2 Drawing Sheets

Figure 1:
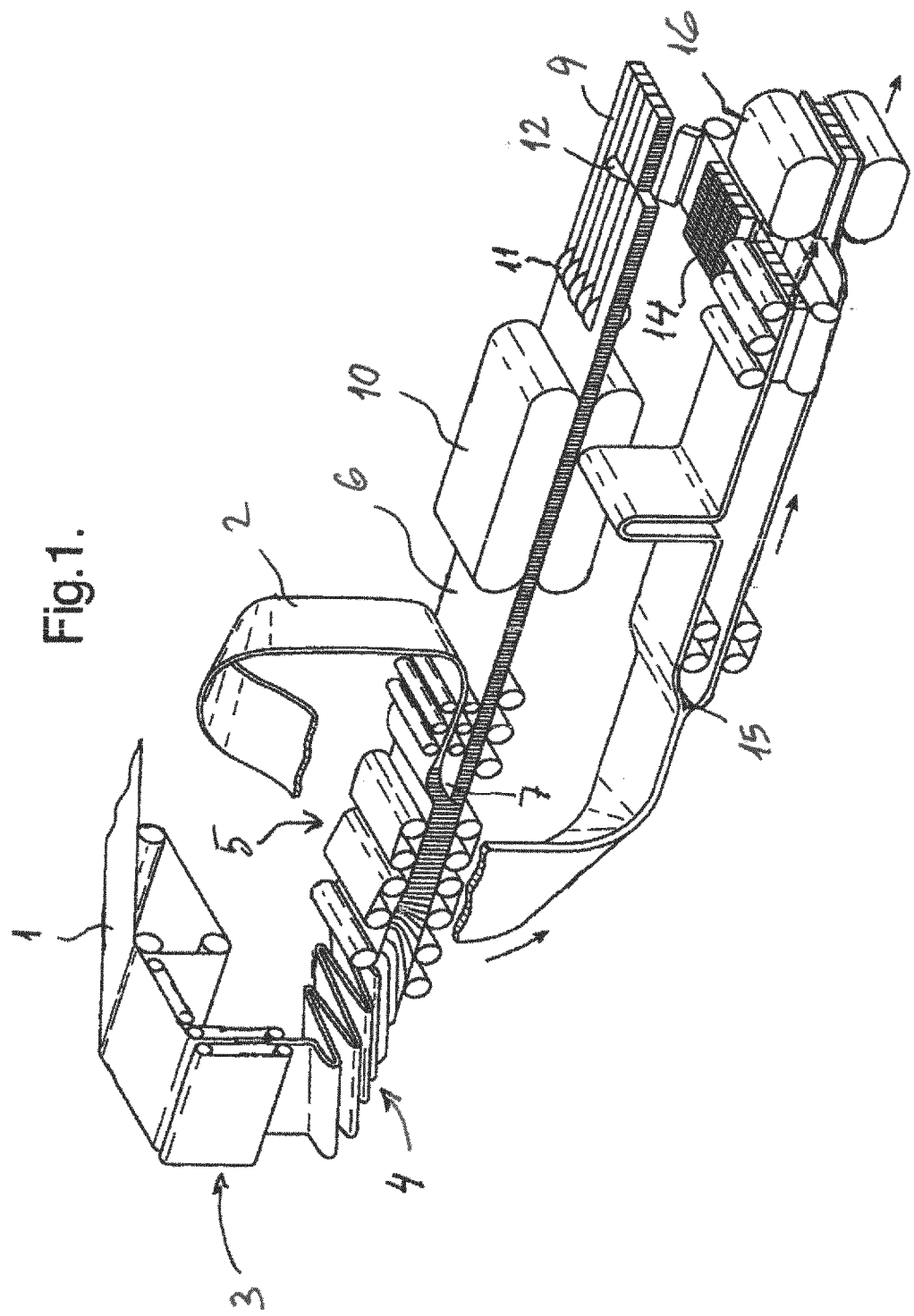

(51) Int. Cl.
*D04H 1/4218* (2012.01)
*D04H 1/4226* (2012.01)

(58) Field of Classification Search
USPC .............................................. 156/196, 307.1
See application file for complete search history.

(56) References Cited

U.S. PATENT DOCUMENTS

| | | | | |
|---|---|---|---|---|
| 5,981,024 A | * | 11/1999 | Noergaard | B32B 3/04 |
| | | | | 264/103 |
| 5,992,093 A | * | 11/1999 | De Groot | A01G 31/001 |
| | | | | 47/59 R |
| 2005/0221061 A1 | * | 10/2005 | Toas | B32B 5/26 |
| | | | | 428/192 |

* cited by examiner

METHOD OF FORMING A CURED MINERAL FIBRE PRODUCT

CROSS-REFERENCE TO RELATED APPLICATIONS

This application is the U.S. National Phase of PCT/EP2013/075607 filed Dec. 5, 2013, which claims priority of European Patent Application 12196426.6 filed Dec. 11, 2012.

The present invention relates to a method of forming a cured mineral fibre product.

From e.g. WO 95/20708 and WO 2008/155401 it is well known to form a primary web of mineral fibres which are produced from a melt of mineral material and where the primary web is laid out on a secondary web by a pendulum conveyor. The secondary web is then processed to form a multi-layered mineral fibre product with a base layer and at least a top layer having a higher density than the base layer.

In WO 2008/155401 there is described a method where the top layer is separated from the secondary web after the compression of the web in a "peel off"-like manner, i.e. splitting the web in the thickness direction by means of a horizontal knife. The base layer on the secondary web is then cured and the separated top layer is then later re-joined with the mineral fibre web to form a multi-layered product, such as a sandwich or dual density product.

The problem associated with this known method is that the top layer also requires processing before being re-joined with the base layer. However, by the invention it is realised that this aspect can be improved by a method of forming a cured mineral fibre product comprising at least a top layer comprising mineral fibres and a base layer comprising mineral fibres, said method comprising the steps of:

providing the top layer web comprising uncured mineral wool;

providing the base layer web comprising cured mineral wool;

joining the uncured top layer web and the cured base layer web to form an assembled laminate;

curing the top layer web in a curing oven by transporting the assembled laminate into a curing oven comprising an upper conveyor and a lower conveyor for curing the assembled laminate, said assembled laminate being positioned between said upper and lower conveyors;

wherein the uncured top layer web is compressed by at least 50% upon entry into the curing oven.

By the invention it is found that the base layer, which is cured when the uncured top layer is laminated onto the base layer, may act as a backing layer and therefore the entry into the curing oven can be used as a compression zone for the uncured top layer. This is advantageous since the step of compressing the top layer prior to the joining and curing thereby may be omitted or at least reduced.

Preferably, the fibre orientation of the top layer is substantially horizontal. Moreover, the fibre orientation of the base layer is preferably substantially vertical, i.e. substantially in the direction of the compression of the top layer, since this increases the compression strength of the base layer.

In general when terms like "horizontal" and "vertical" or similar directional references are used in the present disclosure, these terms are meant to be understood as relative terms e.g. where the term "vertical" refers to the direction of the thickness of the web or product and "horizontal" refers to a direction perpendicular to the thickness of the web or product.

In a preferred embodiment of the invention, the vertical fibre orientation of the base layer is achieved by cutting the cured base layer web into lamellae, which are turned 90° and reassembled to form the base layer web with a vertical fibre orientation. This provides the final dual density product with additional compression strength just as this ensures an enhanced backing layer when the top layer is compressed.

In an alternative embodiment of the invention, the vertical fibre orientation of the base layer is achieved by pleating a mineral fibre web.

By the invention it is realised that by the compression the top layer according to the method, the top layer may be provided with a density of two to three times the density of the base layer.

Figure 2:
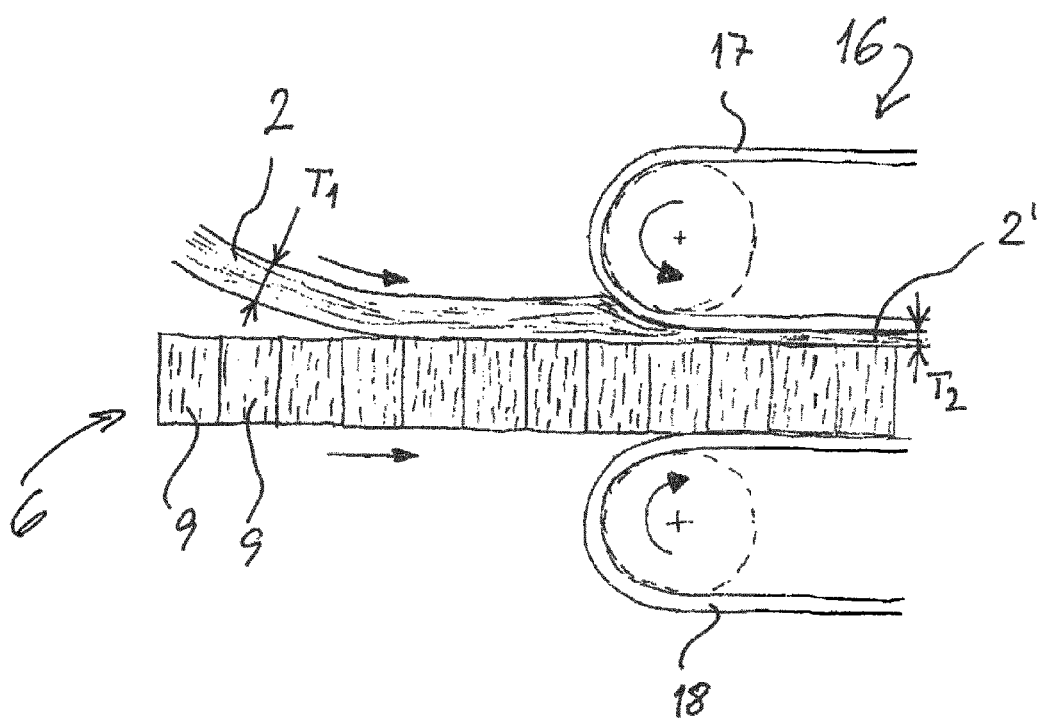

In the following the invention is described in more detail with reference to the accompanying drawings, in which:

FIG. 1 is a schematic illustration of a process of making a mineral fibre product according to the prior art; and FIG. 2 is a detailed schematic side view of an embodiment of the invention.

A process according to the prior art illustrating the context in which the method according to the present invention pertains is described below with reference to FIG. 1.

A mineral melt is fiberised and the fibres collected on a permeable conveyor as an air-laid web (not shown). The air laid web 1 is passed on conveyors to a pair of pendulum conveyors 3 which cross-lap the web 1 to form a cross-lapped web 4. The cross-lapped web 4 is then passed through sets of rollers 5 to subject the cross-lapped web 4 to height compression and longitudinal compression.

A horizontal knife is positioned at point 7 which cuts the web 4 in the horizontal plane to separate the web 4 into two layers, the base layer 6 and the covering top layer 2. The base layer 6 is cured in a first curing oven 10 and is then cut into lamellae 9 by circular saws 11. The lamellae 9 are cut into lengths corresponding to the desired dimensions of the final product by a circular saw 12 and the lamellae are then turned by 90 degrees to form a lamellar base section 14.

In the embodiment in FIG. 1, which corresponds to the disclosure of WO 2008/155401, the covering top layer 2 is split into two by cutting the layer in the horizontal plane with a saw 15 to make an upper covering layer and a lower covering layer. The upper and lower covering layers are placed on each side of the lamellar base section 14 at point 18 to form a covered lamellar section 20 and subsequently cured in a second curing oven 16.

FIG. 2 shows the position where the top layer 2 is re-joined to the base layer 6 as the two layers 2, 6 enter the second curing oven 16. The base layer 6 is preferably lamellae 9 of mineral fibres having a vertical fibre orientation and already cured before being formed in this configuration. The top layer 2 is uncured and it is compressed as it enters into the nip between the upper belt 17 of the curing oven and the cured base layer 6 at the entry into the curing oven 16. As indicated in FIG. 2, the thickness of the top layer 2 before it enters the curing oven 16 is $T_1$ and when the top layer 2 is compressed having entered the curing oven 16 between the belt 17 and the cured base layer 6 the thickness is reduced to $T_2$. Since the base layer 6 is cured, and preferably also configured with lamellae having vertically oriented fibres (i.e. fibres oriented in the direction of the compression of the top layer 2), the base layer 6 has a relatively high compression strength and it is therefore the still uncured top layer 2 which is compressed rather than the base layer 6. Hereby a significant reduction in thickness of the top layer 2 can be achieved.

EXAMPLE

An example of an insulating roof product comprises a base layer made of lamellae elements of stone wool provided with a high-density stone wool top layer. The product was made to meet requirements of a compression strength of at least 60 kPa. Therefore, the cured lamella base layer with a vertical fibre orientation was made to have a compression strength of at least 60 kPa.

An uncured top layer with an initial thickness of 125.3 mm and a density of 46.7 kg/m3 was compressed to a thickness of 25.3 mm and a density of 231.4 kg/m3, corresponding to a compression of 79.8%. This compression required a pressure of 22.2 kPa, which is well below the compression strength of at least 60 kPa of the lamella base layer, and it is therefore possible to make such product in accordance with the invention.

The cured base layer preferably comprises lamellae with vertical fibre orientation, since this provides high compression strength in the vertical direction and thereby a relatively high compression of the top layer on entry into the curing oven is possible. However, the invention is also applicable when the cured base layer has horizontal fibre direction or any other fibre direction, as long as the relevant process parameters are adjusted to fit this lower compression strength. It should be mentioned that the compression strength is not only dependent on the fibre orientation, but also on the density and binder content.

The invention claimed is:

1. A method of forming a cured mineral fibre product comprising at least a top layer comprising mineral fibres and a base layer comprising mineral fibres, said method comprising the steps of:
    providing the top layer web comprising uncured mineral wool;
    providing the base layer web comprising cured mineral wool;
    joining the uncured top layer web and the cured base layer web to form an assembled laminate;
    curing the top layer web in a curing oven by transporting the assembled laminate into a curing oven comprising an upper conveyor and a lower conveyor for curing the assembled laminate, said assembled laminate being positioned between said upper and lower conveyors;
    wherein the uncured top layer web is compressed by at least 50% as it enters into the curing oven.

2. A method according to claim 1, wherein the top web layer is compressed by at least 60%.

3. A method according to claim 1, wherein the fibre orientation of the top layer is substantially horizontal.

4. A method according to claim 1, wherein the fibre orientation of the base layer is substantially vertical.

5. A method according to claim 4, wherein the vertical fibre orientation of the base layer is achieved by cutting a mineral fibre web into lamellae, which are turned 90° and reassembled to form the base layer web.

6. A method according to claim 4, wherein the vertical fibre orientation of the base layer is achieved by pleating a mineral fibre web.

7. A method according to claim 1, wherein the top layer after compression is provided with a density of two to three times the density of the base layer.

* * * * *